United States Patent [19]

Chi

[11] Patent Number: 5,067,474

[45] Date of Patent: Nov. 26, 1991

[54] BOILING DETECTING DEVICES FOR A STOVE

[76] Inventor: Lei L. Chi, Fl. 2, No. 13, Lane 534, Wan Ta Road, Taipei, Taiwan

[21] Appl. No.: 589,266

[22] Filed: Sep. 28, 1990

[51] Int. Cl.⁵ .................................. A47J 27/62
[52] U.S. Cl. .................. 126/374; 126/351; 340/540; 340/603; 73/587
[58] Field of Search ............... 126/374, 214 R, 351, 126/388, 39 BA; 99/331; 340/540, 603; 73/590, 587; 219/435, 442, 441

[56] References Cited

U.S. PATENT DOCUMENTS

| | | | |
|---|---|---|---|
| 947,914 | 2/1910 | Junkers | 126/374 X |
| 2,757,869 | 8/1956 | Ray | 126/214 R |
| 3,820,399 | 6/1974 | deGouville | 126/374 X |
| 4,465,228 | 8/1984 | Mori et al. | 126/374 X |
| 4,869,233 | 9/1984 | Stulen et al. | 126/374 |

Primary Examiner—Carl D. Price
Attorney, Agent, or Firm—Morton J. Rosenberg; David I. Klein

[57] ABSTRACT

This invention is directed to a boiling detecting device for a stove. In particular, the boiling detecting device is directed to one utilizing vibration produced by the boiling water to trigger an electronic circuit to turn off the gas supply, or the stove's power supply, or the like. The device comprises a vibration detecting support, a vibration sensor, a frequency to voltage converter, a voltage detector, a driving stage, and safety device.

2 Claims, 3 Drawing Sheets

BOILING DETECTING DEVICES FOR A STOVE

BACKGROUND OF THE INVENTION

There are various boiling detecting devices on the market, but none of them can be satisfactorily applied to a heater which is not integrally formed with the heated container. Therefore, it is an object of the present invention to provide an improved boiling detector for a stove which may obviate and mitigate the above-mentioned disadvantage.

SUMMARY OF THE INVENTION

This invention relates to a boiling detector for a stove.

It is the primary object of the present invention to provide a device which utilizes a sensor to detect the vibration of boiling water, and trigger a safety device to cut off the gas supply, the stove's power supply, or the like, thereby ensuring safety and the saving of energy.

It is another object of the present invention to provide a boiling detector for a stove which is simple in construction.

It is still another object of the present invention to provide a boiling detector for a stove which is economical to produce. It is still another object of the present invention to provide a boiling detector for a stove which is suitable to manufacture by mass production.

Other objects, merits, and a more complete understanding of the instant invention will be obtained, by those having ordinary skill in the art, from the following detailed description when considered in connection with the accompanying drawings.

DETAILED DESCRIPTION OF THE PREFERRED EMBODIMENT

Figure 1:
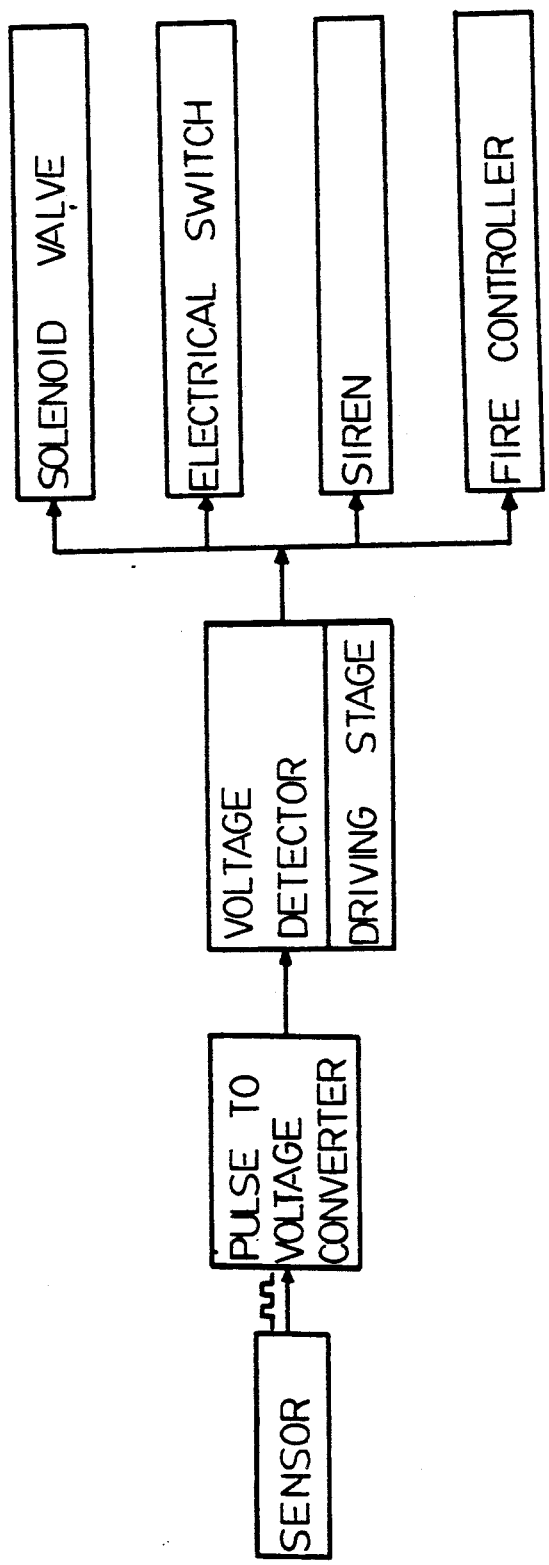
FIG. 1 is a block diagram of the boiling detector.
Figure 2:
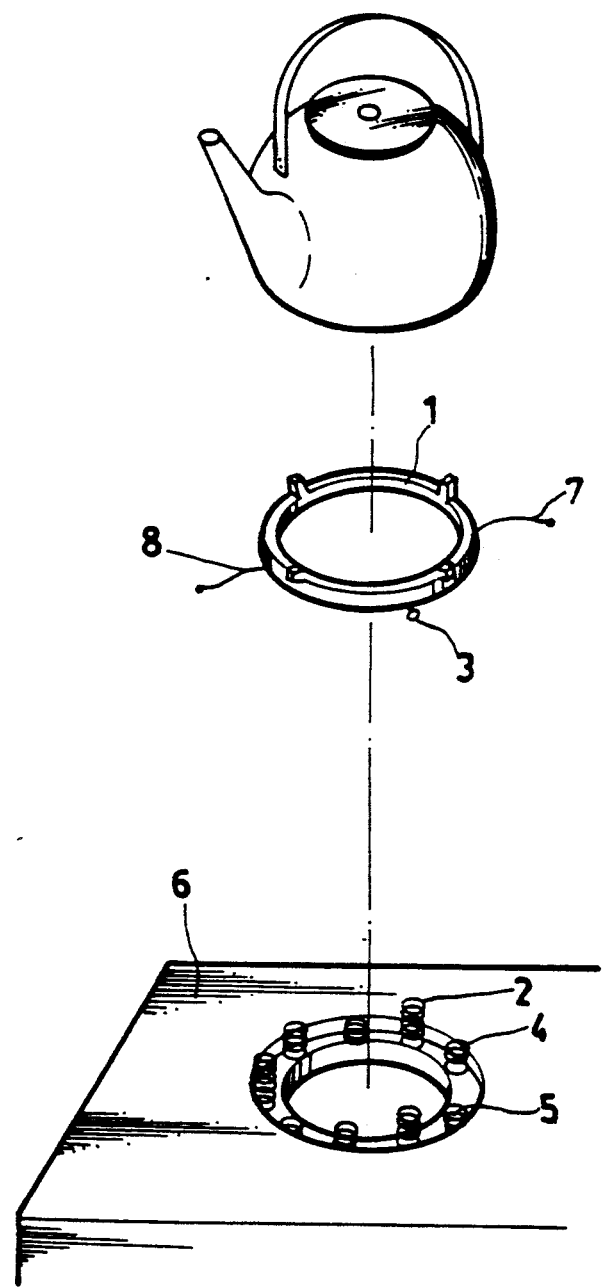
FIG. 2 shows the structure of the vibration detecting support of the boiling detector; and, FIG. 3 is an electrical schematic diagram of the boiling detector.

Referring to the drawings, and in particular to FIGS. 1 and 2, a boiling detector for use on a stove is shown. The boiling detector comprises a vibration detecting support 1, a sensor 3, a frequency to voltage converter, a voltage detector, a driving stage and safety device. The vibration detecting support 1 is disposed on the top 6 of the stove, on which are mounted three sets of springs 2, 4 and 5. The first set 2 of the sets of springs, is the longest in length and has the lowest elasticity coefficient, while the third set 5 of the sets of springs is the shortest in length and has the highest elasticity coefficient.

As water in a container disposed on the stove boils, the container will vibrate and transmit the vibration to the vibration detecting support 1. Then, the sensor 3 will detect the vibration and output a pulse signal which is transmitted to the vibration detection circuit. If the signal frequency from the sensor 3 increases over time and is maintained for a length of time, as established by predetermined threshold set by a variable resistor, the output of the frequency or pulse to voltage converter 9 will be changed from 0 to a predetermined value. The output from converter 9 is transmitted to the voltage detector circuit 10. When the output voltage of the converter circuit 9 reaches a preset triggering point, the voltage detector circuit 10 will output a signal to a driving stage 12 included therein. The driving stage 12 will then actuate an electromagnetic valve, a relay, or various silicon controlled rectifiers so as to drive various other safety devices 13 such as alarm systems.

FIG. 2 shows the structure of the vibration detecting support 1. As illustrated, the vibration detecting support 1 comprises several sets of springs 2, 4 and 5. Each of the sets of springs have different lengths and coefficients of elasticity. Only when the weight of the container exceeds a supporting capability of the longest springs 2 will the container contact the springs 4, or further contact the springs 5.

Figure 3:
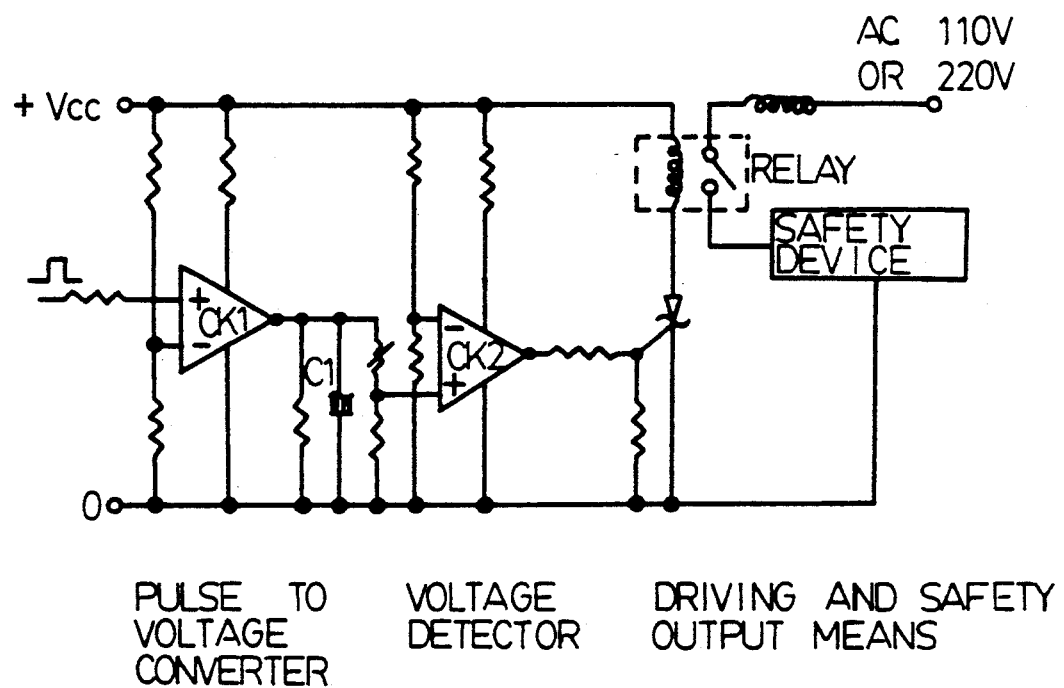

FIG. 3 shows an electrical circuit of the present invention. As illustrated, if the pulse frequency is unsteady and too low, and does not last for a predetermined time, capacitor C1 will not be sufficiently charged, such that CK1 cannot output a sufficiently high voltage to trigger the SCR, TRIAC or the like XY coupled to CK1 through CK2, thereby rendering safety device deactivated. Line 7, as shown in FIG. 2, is used as a voltage input while line 8 as a voltage output.

On the other hand, when water boils, the pot containing the water will vibrate and the vibration detecting support 1 will detect the vibration via the sensor 3, which will output a pulse signal. As the frequency of the pulse signal output from the sensor becomes sufficiently high, and is maintained for a predetermined period of time, CK1 will output voltages to charge C1, responsively. As shown in FIG. 3, the voltage to which C1 charges is input to CK2, having an output switching from a "Lo" to a "Hi" when its input exceeds a predetermined voltage. The "Hi" output from CK2 triggers a switching device, such as an SCR or TRIAC, and thereby energizes a relay 14 to activate a safety device. A variable resistor in the input circuit of CK2 is used to adjust the triggering point at which the safety device is activated.

Although the present invention has been described with a certain degree of particularity, it is understood that the present disclosure is made by way of example only, and that numerous changes in the detail of construction and the combination and arrangement of parts may be modified without departing from the spirit and scope of the invention, as hereinafter claimed.

I claim:

1. A boiling detector for a stove comprising:
   a vibration detecting support resiliently coupled to a stove for supporting a vessel containing a liquid to be heated, said resilient coupling being defined by a plurality of sets of spring members disposed between said vibration detecting support and said stove, each of said sets of spring members being defined by a different length dimension and elasticity coefficient, each with respect to the others;
   a sensor coupled to said vibration detecting support for establishing an output pulse signal responsive to vibration produced by boiling of said liquid in said vessel;
   a frequency to voltage converter coupled to said sensor for generating a voltage proportional to a frequency of said output pulse signal;
   a voltage detector coupled to said frequency to voltage converter for generating an output voltage signal responsive to said proportional voltage having a magnitude above a predetermined value;

a driving stage coupled to said voltage detector for actuating a switching device responsive to said output voltage signal of said voltage detector; and safety means coupled to said driving stage for interrupting energy supplied to said stove.

2. The boiling detector as recited in claim 1, wherein said vibration detecting support includes an annular member supported by at least one set of spring members of said plurality of sets of spring members.

* * * * *